March 19, 1957     K. F. PAUL ET AL     2,785,780
COMBINED MOTOR CONTROL AND ENGINE EXHAUST BRAKE CONTROL
Filed May 13, 1953
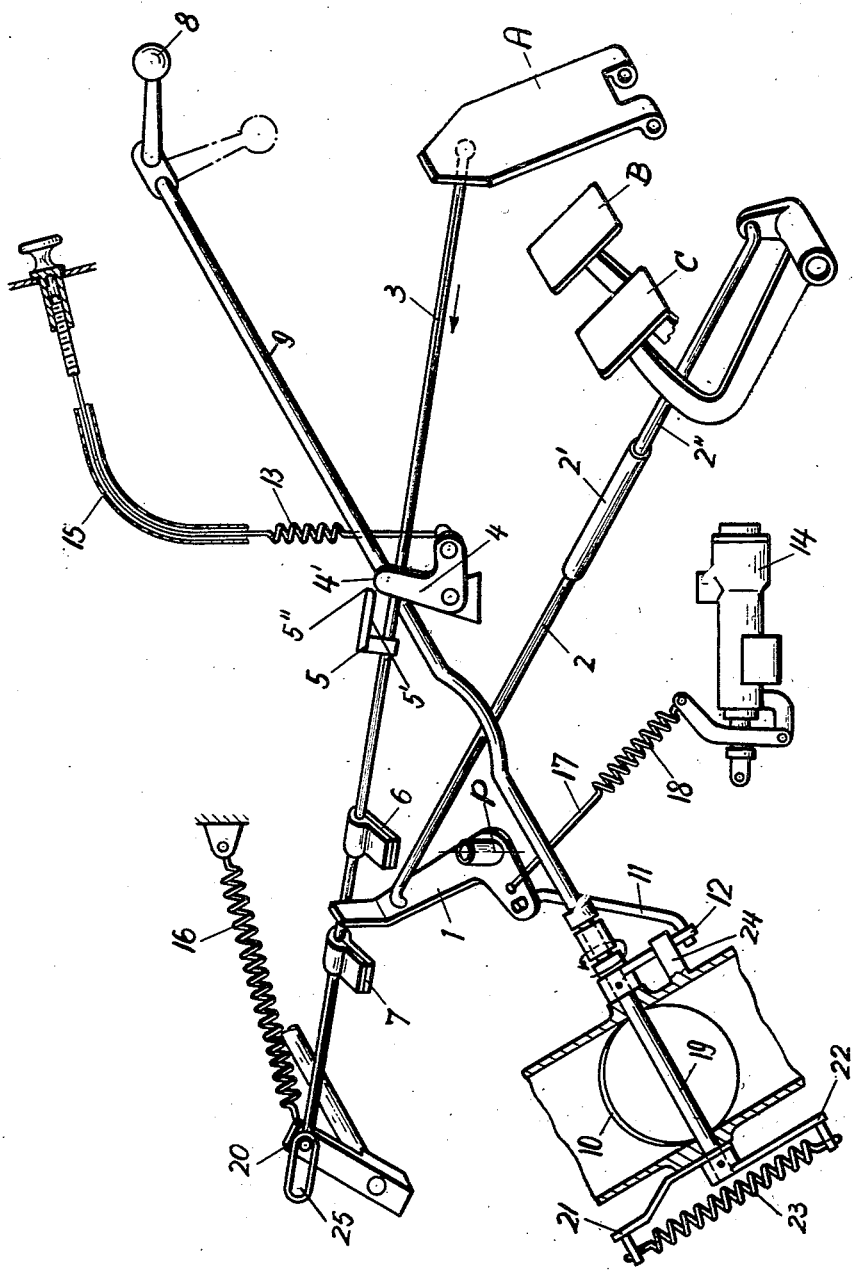
Inventors
Karl F. Paul
Helmut Lohmann
By Wicke, Padlon and Craig
Attorneys

2,785,780

Patented Mar. 19, 1957

2,785,780

COMBINED MOTOR CONTROL AND ENGINE EXHAUST BRAKE CONTROL

Karl F. Paul, Rastatt, and Helmut Lohmann, Gaggenau, Baden, Germany, assignors to Daimler-Benz Aktiengesellschaft, Stuttgart-Unterturkheim, Germany Application May 13, 1953, Serial No. 354,806

Claims priority, application Germany May 13, 1952

3 Claims. (Cl. 192—3)

The present invention relates to motor vehicle engine brakes, and more particularly to a system of braking motor vehicles by means of engine brakes in which the braking effect of the internal combustion engine is increased by closing a throttle valve in the exhaust manifold, located, for instance, in the elbow of the exhaust manifold.

The closing and opening of the braking throttle valve by means of a separate lever also requires a device capable of shutting off and turning on the feed line for the fuel, which device may be appropriately connected with the accelerating and clutching actuating mechanisms.

Devices, by means of which a braking throttle, which may be engaged or closed by a hand lever, can be disengaged or opened again by operating or actuating the clutch lever or pedal, are well known. Other devices are also known which are designed to shut off automatically the fuel feed system while engaging the braking throttle valve, for example, such devices in which the engine brake is actuated by means of a hand lever, and in which the feed line of the fuel is turned on again upon opening or disengaging the braking throttle valve.

When driving the vehicle downhill, it may be necessary to speed up the vehicle momentarily for a short time owing to a lesser incline in curves or owing to a lesser incline which may occur over relatively short distances.

A manual disengaging and a re-engaging of the braking throttle valve by the driver would be troublesome and awkward under those conditions.

It is, therefore, an object of the present invention to redress this handicap and to overcome these shortcomings.

According to the present invention, this may be achieved by an advanced or earlier disengagement of the engine brake or opening of the braking throttle valve upon operation of the clutch or accelerator pedal and by immediately restoring the fuel feed thereafter.

Under the above-mentioned conditions, a relatively short-timed shifting operation may be necessary.

According to the present invention, such short-timed shifting operation may be brought about by a prior disengagement or opening of the braking throttle valve upon operating the clutching pedal and by the hand throttle fuel adjustment being immediately released and being thereby rendered effective again thereafter. Thus, the disengagement or opening of the braking throttle valve always takes place in advance of, or prior to, such short-timed shifting operation. The engine brake, e. g. the braking throttle valve, previously closed by means of the hand lever, may always be disengaged or opened again in advance, by means of either one of the hand lever, the clutching pedal, and the accelerator pedal, care being taken that the hand throttle adjusting the fuel mixture is thereafter again permitted to return to the preset idling speed position of the engine before the clutch disengages so that the engine does not fail to operate.

This is appropriately effected by a double-armed blocking lever, one arm of which is connected with the braking throttle valve, whereas the other arm is directly connected with the clutching pedal by way of a link and is indirectly connected with the accelerator pedal by way of a linkage and by stops provided on the mixture controlling linkage which controls both the shutting off and the turning on of the mixture feed or of the fuel feed, as well as an advanced or earlier disengagement or opening of the braking throttle valve, prior to the effective actuation of the accelerating mechanism. In that way it is possible to operate the clutch and the accelerating pedals with the braking throttle valve engaged and to avoid, also, a stalling of the engine.

Accordingly, it is a principal object of the present invention to provide an engine braking system in internal combustion engine which is interconnected with the clutch actuating mechanism and with the fuel feed and/or fuel mixture control mechanism of the vehicle that upon engagement of the engine brake the fuel feed is first completely cut off before the braking throttle valve of the exhaust manifold is closed, and that upon manual disengagement or automatic disengagement by depressing the clutch or accelerator pedal the braking throttle valve is first opened before the fuel feed is again increased by an amount sufficient to start the engine to run at idling speed.

Further objects and advantages of the present invention will become more obvious from the following description when taken in connection with the single view of the accompanying drawing which shows schematically for purposes of illustration only a device for operating the braking throttle valve in accordance with the present invention.

Referring now more particularly to the drawing, reference numeral 10 designates a throttle valve mounted in the exhaust manifold, for example, at the end of the elbow thereof. The throttling, i. e., the braking of the engine, is effected by actuating the throttle valve 10 which may be opened or closed, that is, placed into operative throttling or inoperative non-throttling position by rotating the valve supporting shaft 19 coupled to the shaft 9 by means of the hand lever 8. The position of lever 8 indicated in full lines in the drawing and that of valve 10, as shown therein, corresponds to the disengaged position of the engine brake when the throttle valve is open. Upon rotation of shaft 9 to a point where the hand lever 8 is in the position indicated in dash-and-dotted lines in the drawing, valve 10 will be rotated in the direction of the arrow to a fully closed position corresponding to the fully-engaged engine brake condition. A fixed stop 24 limits the rotation of the shaft 9. A tension spring 23, one end of which is connected to a fixed arm 21, and the other end of which is connected to the free end of a lever 22 rigidly mounted on the shaft 19 opposite the lever 12, is operative in such a way that the braking throttle valve 10 is always in one or the other position, namely in the engaged, closed position or in the disengaged, open position respectively.

The braking throttle valve 10 is articulately connected to the double-armed blocking lever 1 by means of lever 12, which is firmly secured to the shaft 9, and the connecting rod 11, which is articulately connected to the free end of the lever 12. The double-armed lever 1 is pivotally supported at P and is connected with the clutch pedal C by a connecting rod 2 which is axially shiftable to the left against the pressure of a spring located within the sleeve 2' connected with the extension rod 2'' which in turn is connected with the clutch pedal C. The spring mechanism within sleeve 2' which enables limited relative axial movement of connecting rod 2 against the pressure of the spring located within sleeve 2' is of conventional well-known construction wherein the spring, for example, surrounds the connecting rod 2 and abuts at the right end thereof against a collar or the like provided at the free end of the connecting rod 2 and at its left end against the collar-like portion of sleeve 2' provided at the left end thereof so that the rod system consisting of rod 2, sleeve 2', and rod 2'' always tends to assume its shortest over-all length. The linkage 3 for controlling the amount of fuel mixture or fuel fed to the cylinders carries a stop 5 securely fastened thereto for controlling the bell crank lever 4 which is part of the manual adjusting mechanism for the fuel mixture throttle valve (not illustrated).

The stop 6 brings about zero adjustment of the linkage or rod 3 to adjust the mixture throttle valve (not shown) to zero position, i. e., to cut off the fuel feed, and is simultaneously operative to disengage the braking throttle valve 10 upon operating the accelerating pedal A. The zero adjustment of rod 3 takes place every time the blocking lever 1 is swung in the clockwise direction into the right end position thereof corresponding to the fully closed position of the braking throttle valve 10 by rotation of the hand lever 8 and associated movements of lever 12 and connection rod 11 with the accelerator pedal A and the clutch pedal C disengaged, whereby the blocking lever 1 abuts against the stop 6 and thereby moves along the rod 3 and therewith the fuel control member such as the injection pump controlled by rod 3 to the right into the zero delivery position. The stop 7 is provided for releasing or rendering effective again the hand adjustment mechanism 15, i. e., return the manually operated mixture throttle valve to its previously set effective position by releasing the bell crank lever 4, upon operating the clutching pedal C.

A compensating spring 13 is provided in the manual operating mechanism 15 which serves the purpose of adjusting the mixture throttle valve (not illustrated) by hand.

Reference numeral 20 designates a lever which forms part of the carburetor or fuel injection pump system, while reference numeral 16 designates a spring operative to return the lever 20. A connecting link 25 provided with an elongated hole, is secured to one end of the linkage 3 to connect the linkage 3 with the free end of the lever 20 for limited relative movement so as to permit the linkage 3 to be moved in the direction opposite to that of the arrow after the lever 20 has reached the zero position.

When driving with a trailer, a trailer braking valve 14 may be provided which is coupled with the braking throttle valve 10 by means of the rod 17, the tension spring 18, the double-armed lever 1, the connecting rod 11, and the lever 12. The trailer braking valve 14 may thereby simultaneously be operated together with the braking throttle valve 10.

The bell crank lever 4 of the manually operated adjusting device for the mixture throttle valve is also returned to its zero position by the stop 5 which is rigidly connected with the linkage 3. The spring 13 is designed to compensate for the change of length in the actuating cable caused by the movement of the bell crank lever 4 by the stop member 5 so that the hand throttle knob will always remain in its proper preset position.

According to the present invention, the bell crank lever 4 and the stop 5, the ends of both of which are rounded off at 4' and 5'' respectively, are so designed that the stop 5 will return the bell crank lever 4 to the zero position and will then slide with its sliding surface 5' over the end surface of the lever 4 shortly after reaching the zero position. Too great a movement of the bell crank lever 4 and too great an extension of the spring 13 are avoided thereby when the linkage 3 is shifted extensively. The stop members on the linkage 3 are so arranged as to return the same to zero position during the first half of the engagement or closing operation of the braking throttle valve 10, whereby the fuel feed is completely turned off before the braking throttle valve 10 is snapped into the closed position by the action of the spring 23.

*Operation*

It is assumed that the braking throttle valve 10 is in the position shown in the drawing, namely the open position in which the engine brake is disengaged. It is also assumed that the manual adjustment mechanism 15 for adjusting the mixture throttle valve of the fuel is in the position shown in the drawing, i. e., in the position of minimum opening.

If the hand lever 8 is next turned to the position indicated in dots and dashes in the drawing, then the braking throttle valve 10 will be closed. However, prior to closing thereof, the fuel feed will be completely turned off by the engagement of the upright extension of the double-armed blocking lever 1 with the stop member 6 caused by the clockwise rotation of the double-armed blocking lever 1 around the pivot axis P, which takes place when the shaft 9 is rotated in the direction indicated by the arrow, by reason of the linkage, including levers 11 and 12, between the shaft 9 and the blocking lever 1.

As pointed out above, the stop member 6 is fastened to the linkage or rod 3 in such a manner that the fuel feed is turned to a zero position at least during the first half of the rotation of the shaft 9, whereby the fuel feed is completely cut off before the throttle valve 10 is closed, i. e., before the engine brake is engaged.

The presence of the spring 23 which assures that the throttle valve is in either the open or closed position also assures that the fuel feed control by means of stop member 6 and linkage 3 is first brought to its zero position before the throttle valve 10 is closed.

During the clockwise movement of the blocking lever 1 and the ensuing movement of the linkage 3 in a direction opposite to that of the arrow indicated, the stop member 5 will first return the bell crank lever 4 of the manual fuel mixture adjustment device 15 to the zero position by rotating the bell crank lever 4 in a clockwise direction before sliding over the end surface of the lever 4 with the sliding surface 5' thereof. In other words, regardless of the setting of the knob of the manual fuel mixture adjustment mechanism 15, the bell crank lever 4 is always first returned to a position corresponding to a zero quantity of fuel or fuel mixture fed to the engine before the sliding surface of the stop member is permitted to slide over the rounded off portion 4' of the bell crank lever 4.

Furthermore, the manual adjustment or setting of the knob is not disturbed, since the movement of the bell crank lever is compensated for by the tension spring 13, so that upon disengagement or release of the bell crank lever 4 by the stop member 5, the bell crank lever 4 will return to the preset condition.

If it becomes desirable again to disengage the engine brake, it is only necessary to shift the hand lever 8 back to the position indicated in full lines in the drawing, in which case the braking throttle valve 10 is first opened before the bell crank lever 4 is released, i. e., before fuel may be fed again to the engine.

Thus, during the engagement and disengagement of the engine brake by the manually operated lever 8, the fuel feed is turned off before the throttle valve is closed during engagement of the brake while the throttle valve is first opened before the fuel feed is again established during disengagement of the engine brake.

If for some reason the clutch pedal is operated while the engine brake is engaged, as may be the case, for example, when changing speed while driving down a steep hill, such actuation of the clutch pedal C will turn the double-armed blocking lever 1 counterclockwise about its pivot axis P, thereby opening the throttle valve 10 by the existing connection thereof with the blocking lever 1 including levers 11 and 12 before the upright end of the blocking lever 1 engages the stop member 7 of the linkage 3 to reopen the fuel feed to the engine. Thus, upon actuation of the clutch pedal C the throttle valve 10 is first opened and therewith the engine brake released before the linkage 3 is moved in the direction of the arrow by the interaction of the upright arm of the blocking lever 1 with the stop member 7 to release the bell crank lever 4 and to resume feeding of the fuel; the release of the clutch pedal C then only takes place after the engine starts again and runs at idling speed.

As pointed out before, the link 25 provided with an elongated opening permits limited relative movement between the linkage 3 and accelerator pedal A, on the one hand, and the carburetor or fuel injection pump adjusting lever 20, on the other. Thus, when the linkage 3 is moved in a direction opposite to that of the arrow by the interaction between the upright arm of the blocking lever 1 and the stop member 6, then limited relative movement takes place between the linkage 3 and the adjusting lever 20 once the latter reaches its zero position, i. e., the position where the fuel is substantially cut off. Accordingly, the linkage 3 will continue its movement in the direction opposite to that of the arrow even after the adjusting lever 20 reaches its zero end position, and may do so by the provision of the elongated aperture in the connecting link 25 so as to be able to control the bell crank lever and slide over the end of the bell crank lever 4 by means of the sliding surface 5' of stop member 5.

If it becomes necessary thereafter to actuate or depress the accelerator pedal A while the braking throttle valve 10 is still closed, i. e., in engine braking position and while limited movement between adjusting lever 20 and linkage 3 has taken place as described above, then at first such actuation of the accelerator pedal A will occur without corresponding movement of the adjusting lever 20 until the pin of the adjusting lever 20 comes to rest against the right end portion of the elongated aperture in link member 25. However, during such relative movement between the linkage 3 and the adjusting lever 20 the stop member 6 will turn the blocking lever 1 counter-clockwise about its pivot axis P so that the braking throttle valve 10 is again opened during such limited relative movement between the linkage 3 and the adjusting lever 20.

Consequently, when the accelerator pedal A is depressed while the engine brake is engaged, the engine brake will first be disengaged by opening the throttle valve 10 before resuming feeding of fuel to the engine. Furthermore, the stop member 5 with its sliding surface 5' is so positioned on linkage 3 relative to the bell crank lever 4 that the latter is not released when the accelerator pedal A is depressed until the braking throttle valve 10 is re-opened as described above.

Thus, the throttle valve 10 is also automatically opened by depressing either the clutch pedal C or the accelerator pedal A before any fuel or fuel mixture can be fed to the engine again, thereby assuring against the occurrence of any explosions or ignitions of fuel mixtures in the engine while the throttle valve is still closed or partially closed which might damage the engine.

What is claimed is:

1. In an automotive vehicle with an internal combustion engine including a fuel supply, a foot accelerator pedal for controlling said supply, a clutch pedal, an exhaust passage for said engine including a valve located therein for shutting off said exhaust passage, means for manually controlling said valve and said fuel supply, and means operated by said foot accelerator pedal and by said clutch pedal to open said valve upon depressing one of said pedals, said means being operative to first interrupt fully the fuel supply before closing said valve upon actuation of said manual control means in one direction and for first opening said valve upon actuation of said manual control means in the opposite direction as well as upon depressing one of said pedals before resuming the fuel supply to start the engine idling again, said pedal-operated means including a two-armed blocking lever, a lever fastened to said valve, means for articulately connecting one arm of said blocking lever with the lever of said valve, means for connecting the other arm of said blocking lever with said clutch pedal, means for connecting the accelerator pedal with the means for controlling the fuel supply, stop members secured to the means for connecting said accelerator with said means for controlling the fuel supply, said stop members, on the one hand, being operative to turn on and shut off the fuel supply by said blocking lever upon actuation thereof by said means for manually controlling said valve or by said clutch pedal for controlling said valve by foot and, on the other hand, being operative to actuate said blocking lever for opening or shutting off said valve upon actuation or release of said accelerator pedal respectively.

2. In an automotive vehicle with an internal combustion engine including a fuel supply, a foot accelerator pedal for controlling said supply, a clutch pedal, an exhaust passage for said engine including a valve located therein for shutting off said exhaust passage, means for manually controlling said valve and said fuel supply, and means operated by said foot accelerator pedal and by said clutch pedal to open said valve upon depressing one of said pedals, said means being operative to first interrupt fully the fuel supply before closing said valve upon actuation of said manual control means in one direction and for first opening said valve upon actuation of said manual control means in the opposite direction as well as upon depressing one of said pedals before resuming the fuel supply to start the engine idling again, said pedal-operated means including a two-armed blocking lever, a lever fastened to said valve, means for articulately connecting one arm of said blocking lever with the lever of said valve, means for connecting the other arm of said blocking lever with said clutch pedal, means for connecting the accelerator pedal with the means for controlling the fuel supply, stop members secured to the means for connecting said accelerator with said means for controlling the fuel supply, said stop members, on the one hand, being operative to turn on and shut off the fuel supply by said blocking lever upon actuation thereof by said means for manually controlling said valve or by said clutch pedal for controlling said valve by foot and, on the other hand, being operative to actuate said blocking lever for opening or shutting off said valve upon actuation or release of said accelerator pedal respectively, said means for manually controlling said fuel supply including a lever, one of said stop members being provided with a sliding surface and being fastened to said means for connecting the accelerator pedal with the means for controlling the fuel supply for operative engagement with said lever to move said lever to zero position and thereafter slide with the sliding surface over the end surface of said lever during movement of the means for connecting the accelerator pedal with the means for controlling the fuel supply in one direction.

3. In an automotive vehicle with an internal combustion engine including a fuel supply having a zero fuel supply position, means for normally adjusting said fuel supply to an idling speed position other than said zero fuel supply position, a foot accelerator pedal for controlling said fuel supply, a clutch pedal, an exhaust passage for said engine including a valve located therein for shutting off said exhaust passage, control means independent of said foot accelerator pedal for manually actuating both said valve and said fuel supply to first interrupt fully the fuel by disabling said first-mentioned means and adjusting said fuel supply to zero position before closing said valve upon actuation of said manual control means in one direction and for first opening said valve upon actuation of said manual control means in the opposite direction before restoring the fuel supply by re-enabling said first-mentioned means, and means operated by said foot accelerator pedal and by said clutch pedal to open said valve upon depressing one of said pedals before restoring the fuel supply to start the engine idling again by re-enabling said first-mentioned means.

References Cited in the file of this patent
UNITED STATES PATENTS

| | | |
|---|---|---|
| 1,890,790 | Messinger | Dec. 13, 1932 |
| 1,940,712 | Ertz | Dec. 26, 1933 |
| 2,198,247 | Grob | Apr. 23, 1940 |